United States Patent [19]

Müller et al.

[11] 4,185,200

[45] Jan. 22, 1980

[54] APPARATUS FOR LOADING AND UNLOADING CASSETTES FOR X-RAY FILMS

[75] Inventors: Jürgen Müller; Heinrich Färber, both of Munich, Fed. Rep. of Germany

[73] Assignee: AGFA-Gevaert Aktiengesellschaft, Leverkusen, Fed. Rep. of Germany

[21] Appl. No.: 971,119

[22] Filed: Dec. 19, 1978

[30] Foreign Application Priority Data

Dec. 30, 1977 [DE] Fed. Rep. of Germany ....... 2758980

[51] Int. Cl.² .............................................. G11B 1/00
[52] U.S. Cl. ................................... 250/471; 250/468; 271/3; 354/177
[58] Field of Search ................ 250/468, 471; 354/177; 271/3, 8, 18, 162, 163

[56] References Cited

U.S. PATENT DOCUMENTS 3,828,195  8/1974  Snarr ................................... 250/468

FOREIGN PATENT DOCUMENTS 1497446  8/1970  Fed. Rep. of Germany .

*Primary Examiner*—Craig E. Church
*Assistant Examiner*—Thomas P. O'Hare
*Attorney, Agent, or Firm*—Peter K. Kontler

[57] ABSTRACT

Apparatus for admitting sheets of unexposed X-ray film into and for removing sheets of exposed X-ray film from cassettes of the type having two pivotally connected sections which are separably locked to each other has a housing with a wall which is pivotable to and from an open position in which a cassette containing a sheet of exposed film is inserted into the housing so that one of its sections lies against a pivotable partition while the latter assumes a first position to thereby seal a cassette-receiving first compartment from a second compartment of the housing. A mechanism is actuated in the closed position of the wall to unlock the cassette in the first compartment and to hold the other section of such cassette against movement with the partition. The partition is thereupon pivoted to a lowermost position, together with the one section of the cassette, so that the exposed sheet can descend by gravity into a tray in the second compartment. On its way back to the first position, the partition moves the one section into the range of a suction head which transfers an unexposed sheet from a tray in the second compartment into the space between the two sections. The cassette is locked and its other section detached from the mechanism when the partition returns to its first position, and the locked cassette is removed from the first compartment on movement of the wall to open position.

10 Claims, 1 Drawing Figure

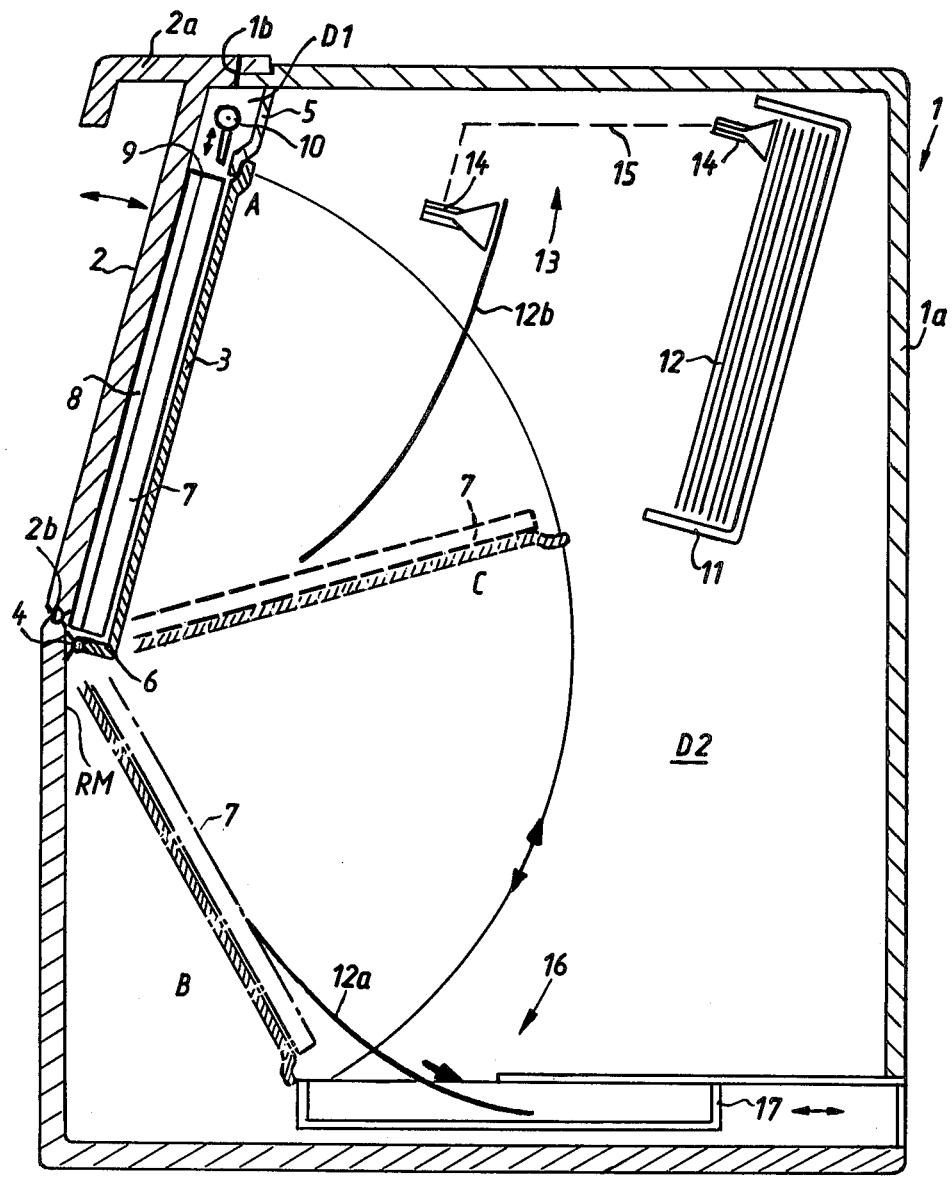

APPARATUS FOR LOADING AND UNLOADING CASSETTES FOR X-RAY FILMS

BACKGROUND OF THE INVENTION

The present invention relates to improvements in apparatus for loading and unloading containers for photosensitive material, especially for removing exposed sheet of X-ray film from and/or introducing unexposed sheets of X-ray film into cassettes of the type wherein two or more sections of the cassette are coupled with but movable relative to each other and can be locked to each other in closed position of the cassette.

It is known to load or unload cassettes for X-ray film in a lighttight housing wherein an exposed sheet of X-ray film is transferred into a tray and the cassette thereupon receives a sheet of unexposed film. It is also known to equip such housings with mechanisms for unlocking a freshly admitted cassette so as to allow for removal of exposed film and subsequent introduction of an unexposed sheet.

German Pat. No. 1,497,446 discloses an apparatus wherein the cassette is placed onto a pivotable horizontal table which is installed in a lighttight housing. The table is pivoted in a first direction and cooperates with a first device which unlocks a cassette on the table so that the cassette is allowed to assume a partly open position whereby the exposed sheet is supposed to leave the cassette under the action of gravity. The table is thereupon pivoted back to and beyond the horizontal position, and the cassette thereon is opened by a second device so as to allow for introduction of an unexposed sheet. Removal of the freshly loaded and locked cassette takes place subsequent to pivoting of the table back to its horizontal position.

Such apparatus are quite complex, bulky and expensive. Furthermore, the interval which elapses between introduction of a cassette containing exposed film and the withdrawal of such cassette (with a sheet of unexposed film therein) is long. Opening of the housing for insertion or withdrawal of cassettes also takes up a substantial amount of time. Such opening necessitates unlocking of a lid and movement of the lid to an open position. The same procedure is repeated in reverse order upon insertion of the next cassette. The opening is rather narrow and does not allow for predictable insertion of successive cassettes with little loss in time.

OBJECTS AND SUMMARY OF THE INVENTION

An object of the invention is to provide a compact, simple and inexpensive apparatus for loading and unloading containers for photosensitive material, especially cassettes for sheets of X-ray film.

Another object of the invention is to provide an apparatus wherein the unloading and renewed loading of containers takes up a short interval of time.

A further object of the invention is to provide an apparatus wherein all operations including insertion of a container, unlocking of the inserted container, unloading of the container, reloading and locking of the container and removal of the freshly loaded container can be carried out automatically in a predetermined sequence.

An additional object of the invention is to provide an apparatus which can accept available containers for X-ray film or the like.

Another object of the invention is to provide the apparatus with novel and improved means for supporting and moving a section of a container.

An additional object of the invention is to provide an apparatus which can be manipulated, insofar as necessary, and supervised by semiskilled or unskilled attendants.

The invention is embodied in an apparatus for introducing photosensitive material (particularly X-ray films in the form of sheets) into and for evacuating such material from containers (e.g., flat cassettes) of the type having two sections movable relative to each other between open and closed positions and being normally detachably locked to each other. The apparatus comprises a housing having a sealable opening for admission and removal of loaded containers, a partition or an analogous support movable in the housing to and from a first position in which the housing and the partition define a first compartment for reception of a locked container by way of the opening and a second compartment which is sealed from the first compartment in the first position of the partition, means for unlocking the container in the first compartment (such unlocking means preferably comprises means for holding one section of the container against movement with the partition), and means for moving (preferably pivoting) the partition and the other section of the unlocked container (while the opening of the housing is sealed against entry of light) between the first position, a second position in which photosensitive material can be evacuated from between the sections of the unlocked container (e.g., by gravity) and a third position in which photosensitive material can be introduced between the sections of the unlocked container.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a somewhat schematic vertical sectional view of an apparatus which embodies the invention, the first, second and third positions of the partition being respectively shown by solid, phantom and broken lines.

DESCRIPTION OF THE PREFERRED EMBODIMENTS

The drawing shows an apparatus which comprises a housing 1 having a first or main portion 1a and a second portion or wall 2 which is pivotable to and from the illustrated closed position in which the wall 2 seals an opening 1b in the main portion 1a so that the housing 1 is sealed against entry of light. The pivot means (e.g., a horizontal hinge) for the wall 2 is shown at 2b, and the reference character 2a denotes a handle which can be grasped by hand to move the wall 2 between open and closed positions.

The housing 1 contains a plate-like partition or support 3 which is movable between a first position A (shown by solid lines), a second position B (shown by phantom lines) and a third position C (indicated by broken lines). When in the position A, the partition 3 sealingly engages one or more inwardly extending stops 5 of the housing 1 to thereby divide the interior of the housing into a first compartment D1 which is adjacent to the inner side of the wall 2 and a second compartment D2 which occupies the major part of the interior of the housing. The pivot means (e.g., a horizontal hinge) for the partition 3 is shown at 4, and the means for pivoting the partition between the positions A, B and C comprises a reversible electric or otherwise powered motor RM. When it engages the stops 5, the partition 3 is slightly inclined with respect to a vertical plane so that the panel or section 7 of a locked container or cassette 9 in the compartment D1 abuts and leans against the partition. The distance between the wall 2 (in the illustrated closed position) and the partition 3 in the position A at least equals the thickness of a cassette 9. The lower portion of the partition 3 defines a recess 6 for the lower part of the section 7. As shown, the lower part of the section 7 fits rather snugly into the recess 6 between the major portion of the partition 3 and the pivot 4. The cassette 9 in the compartment D1 is assumed to contain a sheet 12a of exposed X-ray film and its sections 7 and 8 are pivotally connected to each other in the region of the recess 6 so that the section 7 can share the movements of the partition 3 when the cassette is unlocked. This cassette is inserted into the compartment D1 while the partition 3 assumes the position A and the wall 2 dwells in its open position (not shown).

The compartment D1 further contains a combined unlocking and holding mechanism 10 which can be actuated by hand or in automatic response to closing of the wall 2 to thereby unlock the cassette 9 and to simultaneously hold the section 8 of the unlocked cassette against movement with the partition 3 and section 7. The directions in which the entire or certain parts of the mechanism 10 can move in order to unlock or lock the cassette 9 in the compartment D1 are indicated by a double-headed arrow. For example, the cassette 9 can be provided with a lock of the type shown in the commonly owned copending application Ser. No. 971 120 filed Dec. 19, 1978 by Jürgen Müller, and the unlocking mechanism 10, too, may be similar or analogous to that which is described in the application of Müller. A very simple locking device (e.g., an elementary detent structure with a depressible pin) can be used in the cassette 9 as long as it can maintain the sections 7 and 8 in light-tight engagement with each other in order to prevent penetration of light other than that to which an unexposed sheet (12b) should be exposed during imaging of one or more objects. The mechanism 10 can depress the aforementioned pin and simultaneously hold the section 8 in the illustrated position.

The compartment D2 contains a magazine or tray 11 which constitutes a source of supply of a stack 12 of photosensitive material, e.g., discrete sheets 12b of unexposed X-ray film. The means 13 for transferring unexposed sheets 12a seriatim from the magazine 11 into the space between the sections 7 and 8 (while the partition 3 dwells in or moves past and beyond the position C) comprises one or more suction heads 14 movable along a predetermined path (indicated at 15) to thereby move an unexposed sheet 12b onto the upper side of the section 7 while the partition 3 is located or moves somewhere between the positions A and B on its way toward the section 8 of a cassette 9 in the compartment D1.

When moved to the position B, the partition 3 is located at a lowermost level (below the level of the position C which is located below the level of the position A) and is adjacent to a withdrawable tray 17 at an evacuating station 16 for exposed sheets 12a. The tray 17 can be withdrawn from the housing section 1a by moving it in a direction to the right, as viewed in the drawing. The upper side of the tray 17 is open so that it can intercept a sheet 12a which slides off the section 7 under the action of gravity as soon as the partition 3 reaches the position B. The open upper side of the tray 17 is sealed in a manner known per se (not shown) prior to or during withdrawal of the tray 17 (which then contains a supply of exposed sheets 12a) from the housing 1.

The operation:

A cassette 9 which contains an exposed sheet 12a of X-ray film is inserted into the compartment D1 while the partition 3 is maintained in the position A and the wall 2 is held in open position. The opening 1b is thereupon sealed. In the next step, the unlocking mechanism 10 is actuated, either in response to closing of the wall 2, manually or in response to transmission of a signal by the attendant. This results in unlocking of the cassette 9 and in retention or holding of the section 8 in the illustrated position. The motor RM is started to pivot the partition 3 and the section 7 from the position A to the position B. The section 7 follows such movement of the partition 3 by gravity and moves the sheet 12a to a position in which the sheet 12a leaves the section 7 by gravity and descends into the tray 17 at the evacuating station 16. The motor RM is thereupon reversed to move the partition 3 and the section 7 to the position C. This position can be located substantially midway between the positions A and C, and the orientation of the section 7 is then such that it can support an unexposed sheet 12b. The motor RM is arrested and the transferring means 13 is actuated to move the leftmost sheet 12b of the stack 12 in the magazine 11 along the path 15 and onto the section 7. Removal of a sheet 12b from the magazine 11 can begin before the partition 3 reaches the position C. The suction head or heads 14 continue to advance the removed sheet 12b until the leader of such sheet reaches the innermost portion of the cassette 9, i.e., until the leader moves close to the hinge between the sections 7 and 8. The motor RM is then started to return the partition 3 to the position A. The suction head or heads 14 are disconnected from the suction generating device (not shown) of the transferring means 13 and are withdrawn before the partition 3 is set in motion to advance from the position C back to the position A.

It is clear that the means 13 can transfer a sheet 12b onto the section 7 while the partition 3 continues to move from the position B toward the position A. This merely necessitates some adjustment of parts which define the path 15 for the suction head or heads 14. All that counts is to guide the suction head or heads 14 in such a way that the cassette 9 contains a properly inserted sheet 12b before the partition 3 returns to the position A.

The unlocking mechanism 10 is deactivated when the partition 3 reassumes the position A, i.e., the sections 7 and 8 are locked to each other and sealingly confine a sheet 12b therebetween. The wall 2 is moved to open position and the cassette 9 is replaced with a cassette which contains an exposed sheet 12a.

An important advantage of the improved apparatus is that only one section of a cassette shares the movements of the partition and that the cassette receives an unexposed sheet while the partition moves between the end positions A, B or while the partition dwells between such end positions. Moreover, the cassette is unlocked and again locked only once upon introduction into the compartment D1. Still further, the partition 3 serves several functions, i.e., it moves the section 7 and a sheet 12a to the evacuating station 16, it moves the section 7 to the loading station (position C), it moves the section 7 and a sheet 12b into the compartment D1, and it seals the compartment D1 from the compartment D2 (to prevent the exposure of sheets 12a, 12b in the compartment D2 to light) during insertion or removal of cassettes from the compartment D1.

Another advantage of the improved apparatus is that a sheet 12b can be inserted to extend all the way into the deepmost portion of a cassette in the compartment D1 because such insertion can begin and can be completed before the partition 3 returns to or moves close to the position A. For example, and as shown in the drawing, insertion of a sheet 12b can be completed while the sections 7 and 8 make an angle of at least 45 degrees. Also, a single unlocking mechanism 10 suffices and the cassette can be locked automatically as soon as the partition 3 reassumes the position A.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. Apparatus for introducing photosensitive material, particularly X-ray films, into and for evacuating such material from containers of the type having two sections movable relative to each other between open and closed positions and being normally locked to each other, comprising a housing having a sealable opening for admission and removal of containers; a partition movable to and from a first position in which said housing and said partition define a first compartment for reception of a locked container via said opening and a second compartment which is sealed from said first compartment in said first position of said partition; means for unlocking the container in said first compartment; and means for moving said partition and one section of the container in said first compartment in sealed condition of said opening between said first position, a second position in which photosensitive material can be evacuated from between said sections into said second compartment, and a third position in which photosensitive material can be introduced between said sections in said second compartment.

2. Apparatus as defined in claim 1, wherein said photosensitive material is in the form of sheets and said partition is pivotable between said positions thereof.

3. Apparatus as defined in claim 1, wherein said unlocking means comprises means for holding the other section of a container in said first compartment against movement with said partition.

4. Apparatus as defined in claim 1, wherein said housing comprises a first portion and a second portion which is movable with respect to said first portion to respectively expose and seal said opening.

5. Apparatus as defined in claim 1, wherein said photosensitive material is in the form of sheets and the inclination of said one section of a container whose other section is located in said first compartment in said second position of said partition is such that a sheet of photosensitive material can leave the container by gravity.

6. Apparatus as defined in claim 1, further comprising a source of sheets of photosensitive material and means for transferring a discrete sheet from said source between said sections of a container in said first compartment when said partition is at least close to said third position.

7. Apparatus as defined in claim 6, wherein said transferring means includes at least one suction head movable in said second compartment along a predetermined path.

8. Apparatus as defined in claim 1, wherein said partition is located at a first level in said first position, at a lower second level in said third position, and at a lowest third level in said position thereof.

9. Apparatus as defined in claim 1, wherein said third position of said partition is located between said first and second positions.

10. Apparatus as defined in claim 1, further comprising means for sealing said opening, said sealing means forming part of said housing and being pivotable between open and closed positions in which said opening is respectively exposed for insertion or removal of a container from said first compartment and sealed to prevent entry of light into said compartments via said opening.

* * * * *